United States Patent
Liles et al.

(10) Patent No.: US 12,258,881 B2
(45) Date of Patent: Mar. 25, 2025

(54) TURBINE SECTION WITH CERAMIC SUPPORT RINGS AND CERAMIC VANE ARC SEGMENTS

(71) Applicant: RTX CORPORATION, Farmington, CT (US)

(72) Inventors: Howard J. Liles, Newington, CT (US); Bryan P. Dube, Columbia, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/598,235

(22) Filed: Mar. 7, 2024

(65) Prior Publication Data
US 2024/0247592 A1 Jul. 25, 2024

Related U.S. Application Data

(63) Continuation of application No. 17/581,170, filed on Jan. 21, 2022.

(51) Int. Cl.
*F01D 9/04* (2006.01)
*F01D 5/28* (2006.01)

(52) U.S. Cl.
CPC ............. *F01D 9/041* (2013.01); *F01D 5/284* (2013.01); *F01D 9/042* (2013.01); *F05D 2240/12* (2013.01); *F05D 2240/80* (2013.01); *F05D 2250/291* (2013.01); *F05D 2260/30* (2013.01); *F05D 2300/6033* (2013.01)

(58) Field of Classification Search
CPC .......... F01D 9/041; F01D 5/284; F01D 9/042; F05D 2240/12; F05D 2240/80; F05D 2250/291; F05D 2260/30; F05D 2300/6033
See application file for complete search history.

(56) References Cited

U.S. PATENT DOCUMENTS

| 3,857,649 | A | 12/1974 | Schaller et al. |
| 4,076,451 | A | 2/1978 | Jankot |

(Continued)

FOREIGN PATENT DOCUMENTS

| EP | 1104836 | 6/2001 |
| EP | 2549121 | 1/2013 |
| EP | 2570602 | 3/2013 |

OTHER PUBLICATIONS

European Search Report for European Patent Application No. 23152741.7 mailed May 19, 2023.

*Primary Examiner* — Jacob M Amick
*Assistant Examiner* — Charles J Brauch
(74) *Attorney, Agent, or Firm* — Carlson, Gaskey & Olds, P.C.

(57) ABSTRACT

A turbine section for a gas turbine engine includes inner and outer diameter ceramic matrix composite (CMC) support rings that define a gaspath there between. Each of the inner and outer diameter CMC support rings are monolithic and continuous. CMC vane arc segments are disposed in the gaspath and supported by the inner and outer diameter CMC support rings. Each of the CMC vane arc segments includes inner and outer platforms and an airfoil section there between. At least one retainer engages the inner or outer diameter CMC support rings with the CMC vane arc segments to retain the CMC vane arc segments between the inner and outer diameter CMC support rings.

8 Claims, 6 Drawing Sheets

(56) References Cited

U.S. PATENT DOCUMENTS

| | | |
|---|---|---|
| 6,398,485 B1 | 6/2002 | Frosini et al. |
| 7,445,426 B1 | 11/2008 | Matheny et al. |
| 8,905,711 B2 | 12/2014 | Suciu et al. |
| 10,392,951 B2 | 8/2019 | Carr et al. |
| 10,975,706 B2 | 4/2021 | Farrar et al. |
| 2003/0002979 A1 | 1/2003 | Koschier |
| 2006/0130994 A1 | 6/2006 | Grunstra et al. |
| 2008/0019836 A1 | 1/2008 | Butz et al. |
| 2008/0279679 A1 | 11/2008 | Morrison |
| 2010/0196155 A1 | 8/2010 | Twell |
| 2010/0284805 A1 | 11/2010 | Uskert et al. |
| 2013/0052030 A1* | 2/2013 | McCaffrey ............ F01D 9/041 416/241 B |
| 2013/0136605 A1 | 5/2013 | Bart et al. |
| 2013/0149159 A1 | 6/2013 | Chuong et al. |
| 2016/0201488 A1 | 7/2016 | Carr et al. |
| 2019/0360348 A1 | 11/2019 | Carr et al. |
| 2021/0102469 A1 | 4/2021 | Sobanski et al. |
| 2021/0164352 A1 | 6/2021 | Backhouse et al. |
| 2021/0246808 A1 | 8/2021 | Sobanski et al. |
| 2021/0317786 A1 | 10/2021 | Sobanski |

* cited by examiner

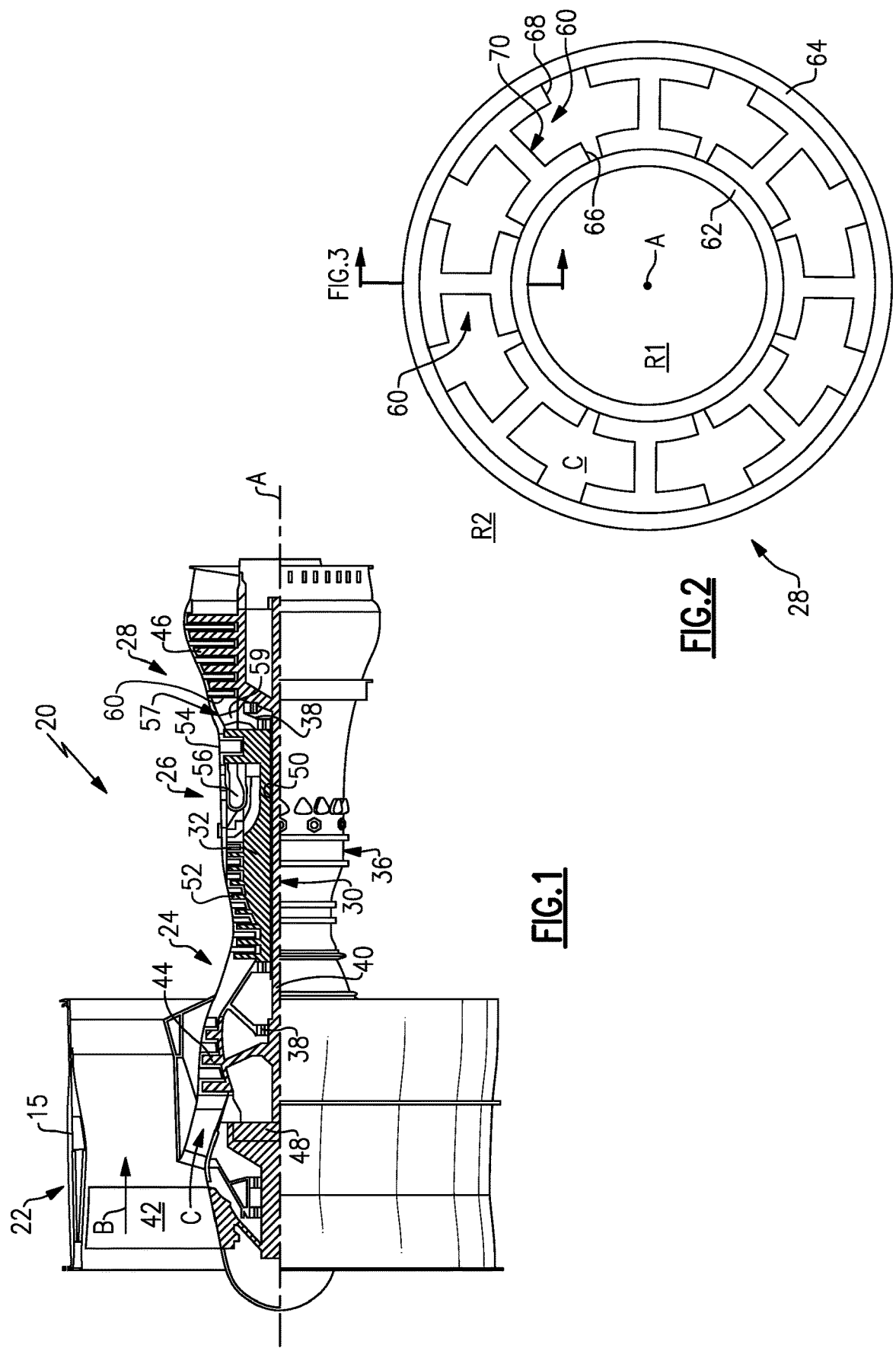

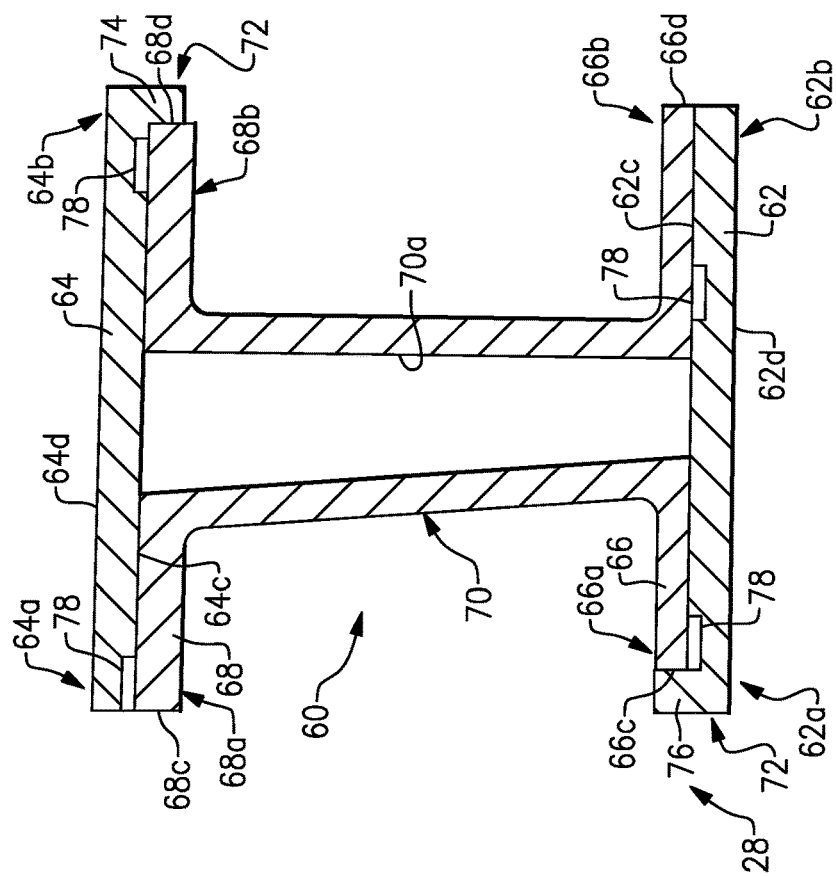
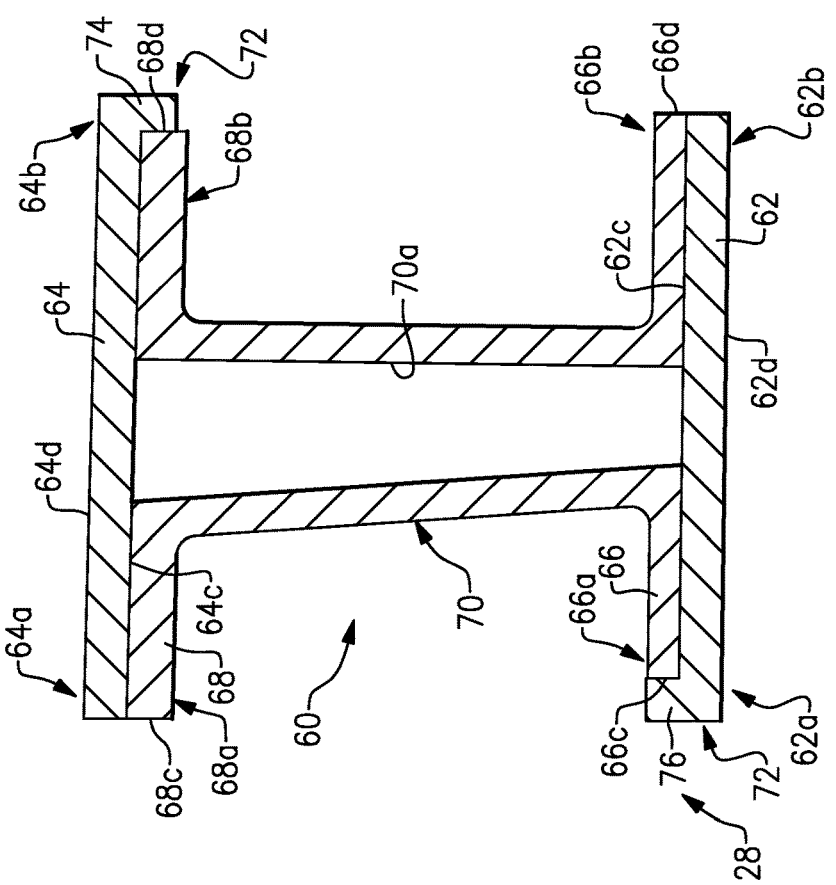

TURBINE SECTION WITH CERAMIC SUPPORT RINGS AND CERAMIC VANE ARC SEGMENTS

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic materials are also being considered for airfoils. Among other attractive properties, ceramics have high temperature resistance. Despite this attribute, however, there are unique challenges to implementing ceramic in airfoils.

SUMMARY

A turbine section for a gas turbine engine according to an example of the present disclosure includes inner and outer diameter ceramic matrix composite (CMC) support rings that define a gaspath there between. Each of the inner and outer diameter CMC support rings are monolithic and continuous. CMC vane arc segments are disposed in the gaspath and supported by the inner and outer diameter CMC support rings. Each of the CMC vane arc segments includes inner and outer platforms and an airfoil section there between. At least one retainer engages the inner or outer diameter CMC support rings with the CMC vane arc segments to retain the CMC vane arc segments between the inner and outer diameter CMC support rings.

In a further embodiment of any of the foregoing embodiments, the outer diameter CMC support ring defines an outer diameter support ring aft end and a first support ring flange that extends radially-inwardly from the outer diameter support ring aft end, the first support ring flange serves as the at least one retainer and engaging an aft face of the outer platform.

In a further embodiment of any of the foregoing embodiments, the inner diameter CMC support ring defines an inner diameter support ring forward end and a second support ring flange that extends radially-outwardly from the inner diameter support ring forward end. The second support ring flange additionally serves as the at least one retainer and engaging a forward face of the inner platform.

In a further embodiment of any of the foregoing embodiments, there is at least one contact pad between each of i) the outer diameter CMC support ring and the outer platform and ii) the inner diameter CMC support ring and the inner platform.

In a further embodiment of any of the foregoing embodiments, the outer diameter CMC support ring defines an outer diameter support ring aft end and a first support ring flange that extends radially-outwardly from the outer diameter support ring aft end, and the outer platform defines an outer platform aft end and a first platform flange that extends radially-outwardly from the outer platform aft end. An aft face of the first support ring flange serves as the at least one retainer and engaging a forward face of the first platform flange.

In a further embodiment of any of the foregoing embodiments, the inner platform defines an inner platform aft end and a second platform flange that extends radially inwardly from the inner platform aft end. The inner diameter ceramic support ring includes an inner diameter support ring aft face serving as the at least one retainer and engaging a forward face of the second platform flange.

In a further embodiment of any of the foregoing embodiments, the inner diameter CMC support ring circumscribes a radially inner region, and the inner diameter CMC support ring fluidly isolates the gaspath from the inner region.

In a further embodiment of any of the foregoing embodiments, the outer diameter CMC support ring bounds a radially outer region and fluidly isolates the gaspath from the radially outer region.

In a further embodiment of any of the foregoing embodiments, the airfoil section of each of the CMC vane arc segments is hollow.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates a gas turbine engine.

FIG. 2 illustrates a portion of the turbine section of the gas turbine engine.

FIG. 3 illustrates a sectioned view of a portion of the turbine section.

FIG. 4A illustrates another example in which there are contact pads between the platforms and the support rings.

DETAILED DESCRIPTION

Figure 4B:
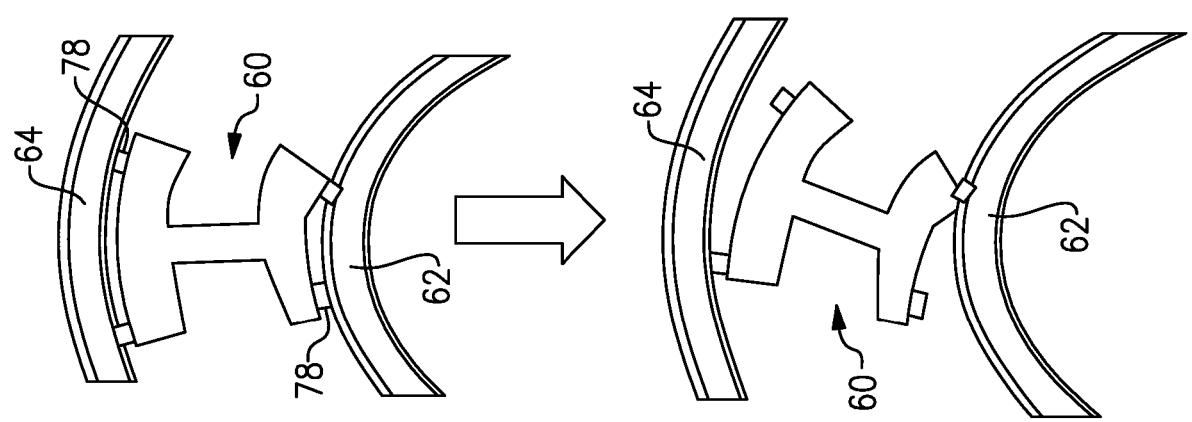
FIG. 4B illustrates a thermal mismatch between inner and outer support rings.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

FIG. 2 illustrates an example of a portion of the turbine section 28 of the engine 20. The turbine section 28 includes ceramic vane arc segments 60 radially disposed between first and second (inner and outer) diameter ceramic support rings 62/64. The support rings 62/64 define a portion of the core flow path C (gaspath) there between and support the ceramic vane arc segments 60. Terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The vane arc segments 60 and the support rings 62/64 are formed of ceramic, such as a monolithic ceramic, ceramic matrix composite (CMC), or combinations of CMCs and monolithic ceramics. CMCs are comprised of a ceramic reinforcement, which is usually ceramic fibers, in a ceramic matrix. Example ceramic matrices of the CMC are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The ceramic matrix composite may be, but is not limited to, a SiC/SiC ceramic matrix composite in which SiC fiber tows are disposed within a SiC matrix. The fiber tows are arranged in a fiber architecture, which refers to an ordered arrangement of the tows relative to one another, such as a 2D woven ply or a 3D structure. Example monolithic ceramics may include, but are not limited to, SiC and $Si_3N_4$. Monolithic ceramics may include, but are not limited to, silicon carbide (SiC) or silicon nitride ($Si_3N_4$).

In general, support schemes for mounting structural vane arc segments formed of ceramic are challenging due to lower material stress limits in comparison to high strength superalloys used for some traditional vane segments. For instance, traditional support schemes that utilize hooks or a series of rails can concentrate stresses, create aerodynamic loads, and/or create thermal stresses which may exceed material limits of fiber-reinforced composites. Therefore, even though ceramic may have many potential benefits, such benefits cannot be realized without a suitable support scheme. In this regard, as discussed below, the disclosed attachment scheme facilitates low-stress support of the vane arc segments 60 while also reducing leakage of the core flow path C.

FIG. 3 illustrates a sectioned view through a portion of the turbine section 28. Each of the vane arc segments 60 includes inner and outer platforms 66/68 and at least one airfoil section 70 there between. The inner platform 66 defines forward and aft ends 66a/66b, and the outer platform 68 likewise defines forward and aft ends 68a/68b. The forward ends 66a/68a have respective forward faces 66c/68c, and the aft ends 66b/68b have respective aft faces 66d/68d. In general, as used herein, "forward" and "aft" ends are the portions in the axially forward 20% or axially aft 20% of the component (by axial length).

The airfoil section 70 in this example is hollow and defines an internal cavity 70a. The cavity 70a serves to reduce the mass of the vane arc segment 60. Although cavities in general are sometimes used for cooling, the cavity 70a here does not receive cooling air, as the vane arc segments 60 are uncooled. In one variation, the cavity 70a receives cooling air to pass to a downstream component for cooling. In this case, sealing may be required to reduce leakage of the cooling air. Alternatively, the airfoil section 70 may be solid as shown in some of the example embodiments herein. In the illustrated example, the vane arc segments 60 are configured as "singlets" in which each separate segment 60 has only a single airfoil section 70. It is to be understood, however, that this disclosure also contemplates use of "multiplets" in which each segment 60 has more than one airfoil section 70, such as two or three airfoil sections 70.

Each of the support rings 62/64 is monolithic and continuous. The term "monolithic" means that the support rings 62/64 are each unitary bodies that do not have mechanical joints. The inner support ring 62 defines a support ring forward end 62a, a support ring aft end 62b, and inner and outer sides 62c/62d. Likewise, the outer support ring 64 defines a support ring forward end 64a, a support ring aft end 64b, and inner and outer sides 64c/64d. The term "continuous" indicates that the rings are uninterrupted full hoops that do not have mate faces that require sealing, but does not preclude holes for cooling air or small borescope holes for inspection. As a result, the rings 62/64 do not have mate faces and seals that may result in leakage losses.

The turbine section 28 further includes at least one retainer 72 engaging the inner or outer diameter ceramic support ring 62/64 with the vane arc segments 60 to retain the segments 60 there between. In the example illustrated in FIG. 3, the support ring 64 includes a first support ring flange 74 that extends radially-inwardly from the support ring aft end 64b. The first support ring flange 74 serves as the retainer 72 and engages the aft face 68d of the outer platform 68. The first support ring flange 74 limits axially aft movement of the vane arc segment 60. Additionally in the illustrated example, the support ring 62 includes a second support ring flange 76 that extends radially-outwardly from the support ring forward end 62a. The second support ring flange 76 serves as another retainer 72 and engages the forward face 66c of the inner platform 66. The second support ring flange 76 limits axially aft movement of the vane arc segment 60.

The support rings 62/64 with the flanges 74/76 enable the mechanical support of the vane arc segments 60 without the need for internal spars to support the load. The support rings 62/64 also serve to react aerodynamic loads from the vane arc segments 60 to an outer turbine case. Additionally, the use of ceramic in the support rings 62/64 reduces mass in comparison to denser nickel alloys and enables avoidance of the need for dedicated cooling due to interfacing with the hot vane arc segments 60 or the close proximity to the gaspath. The full hoop, continuous nature of the support rings 62/64 also eliminates leakage via intersegment gaps between the vane arc segments 60 since there are no mate faces for gases to pass through the support rings 62/64. For example, the inner support ring 62 circumscribes a radially inner region R1 and fluidly isolates the core flow path C from the inner region R1. Similarly, the outer support ring 64 fluidly isolates the core flow path C from a radially outer region R2. Such fluid isolation facilitates minimizing leakages and enhancing engine performance. Additionally, making the vane arc segments 60 and the support rings 62/64 from ceramics that have similar thermal coefficients of thermal expansion facilitates better thermal growth match to reduce any radial gap or mismatch between the vane arc segments 60 and the support rings 62/64 due to thermal growth or thermal transients during engine operation.

FIG. 4A illustrates a further example that is the same as the example of FIG. 3 except that there is at least one contact pad 78. In the example shown, there are four contact pads 78, with two contact pads 78 between the support ring 64 and the platform 68 and two contact pads 78 between the support ring 62 and the platform 66. The contact pads 78 may be in locations at which loads are transferred between the support rings 62/64 and the platforms 66/68. For example, the contact pads 78 may be flanges that are integrally formed with the platforms 66/68 or components that are formed separately and then attached to the platforms 66/68 and/or support rings 62/64. The contact pads 78 may also serve to maintain contact between the platforms 66/68 and the support rings 62/64 when there is thermal expansion/contraction between the platforms 66/68 and the support rings 62/64. For instance, the top illustration in FIG. 4B shows the vane arc segment 60 in a baseline condition in which each of the contact pads 78 is in contact with the respective rings 62/64. The bottom illustration in FIG. 4B shows the vane arc segment 60 under a thermal mismatch condition between the rings 62/64, which has caused the vane arc segment 60 to rotate. In this condition, two of the contact pads 78 have lifted from contact with the rings 62/64. However, the opposed contact pads 78 keep in contact with the rings 62/64 and thus permit the vane arc segment 60 to tolerate some thermal mismatch between the rings 62/64 while still maintaining contact to transmit loads.

Figure 5:
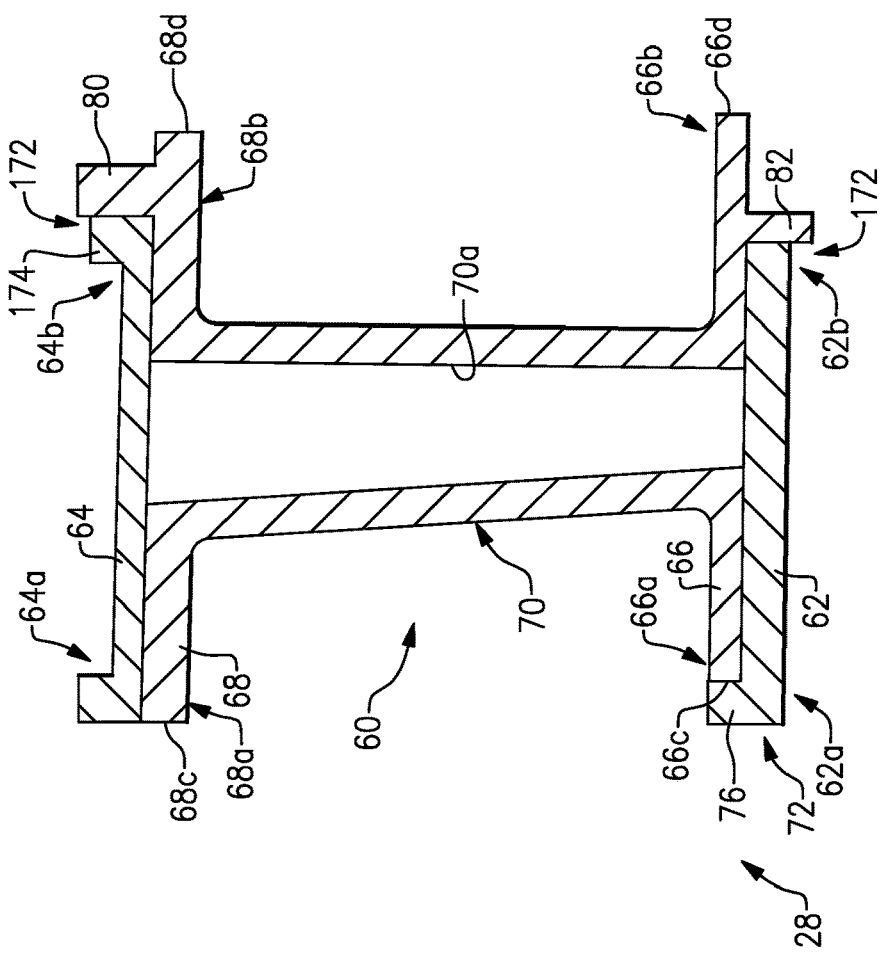
FIG. 5 illustrates another example, in which the platforms also have flanges to retain the vane arc segment.

FIG. 5 illustrates a similar example except that the support ring 64 includes a first support ring flange 174 that extends radially-outwardly from the support ring aft end 64b. The platform 68 also includes a first platform flange 80 that extends radially-outwardly from the platform aft end 68b. The aft face of the first support ring flange 174 serves as a retainer 172 and engaging a forward face of the first platform flange 80. The first support ring flange 174 limits axially forward movement of the vane arc segment 60. As shown, the platform 66 also has a second platform flange 82 that extends radially inwardly from the platform aft end 66*b*. The aft face of the support ring 62 serves as another retainer 172 and engages the forward face of the second platform flange 82. The aft face of the support ring 62 limits axially forward movement of the vane arc segment 60.

Figure 6:
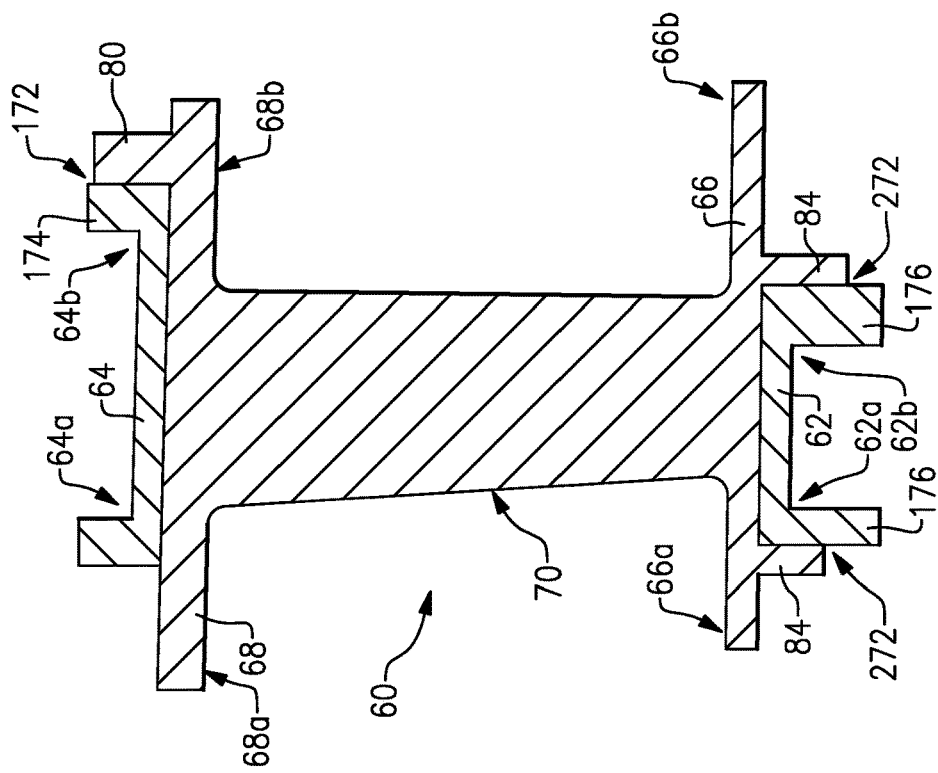
FIG. 6 illustrates an example of another configuration of retainers in which there are two retainers at the inner diameter.

FIG. 6 illustrates a similar example in which the support ring 64 includes a first support ring flange 174 that extends radially-outwardly from the support ring aft end 64*b* and the platform 68 also includes a first platform flange 80 that extends radially-outwardly from the platform aft end 68*b*. The aft face of the first support ring flange 174 serves as a retainer 172 and engaging a forward face of the first platform flange 80. The first support ring flange 174 limits axially forward movement of the vane arc segment 60. As shown, the platform 66 also has second platform flanges 84 that, respectively, extend radially inwardly from the platform forward and aft ends 66*a*/66*b*. The second support ring 62 includes second support ring flanges 176 that, respectively, extend radially inwardly from the support ring forward and aft ends 62*a*/62*b*. The aft face of the second support ring flange 176 at the support ring aft end 62*b* serves as another retainer 272 and engages the forward face of the second platform flange 84 on the platform aft end 66*b* to limit axially aft movement of the vane arc segment 60. The forward face of the second support ring flange 176 at the support ring forward end 62*a* serves as another retainer 272 and engages the aft face of the second platform flange 84 on the platform forward end 66*a* to limit axially forward movement of the vane arc segment 60. Thus, there are two retainers 272 on the inner diameter of the vane arc segment.

Figure 7:
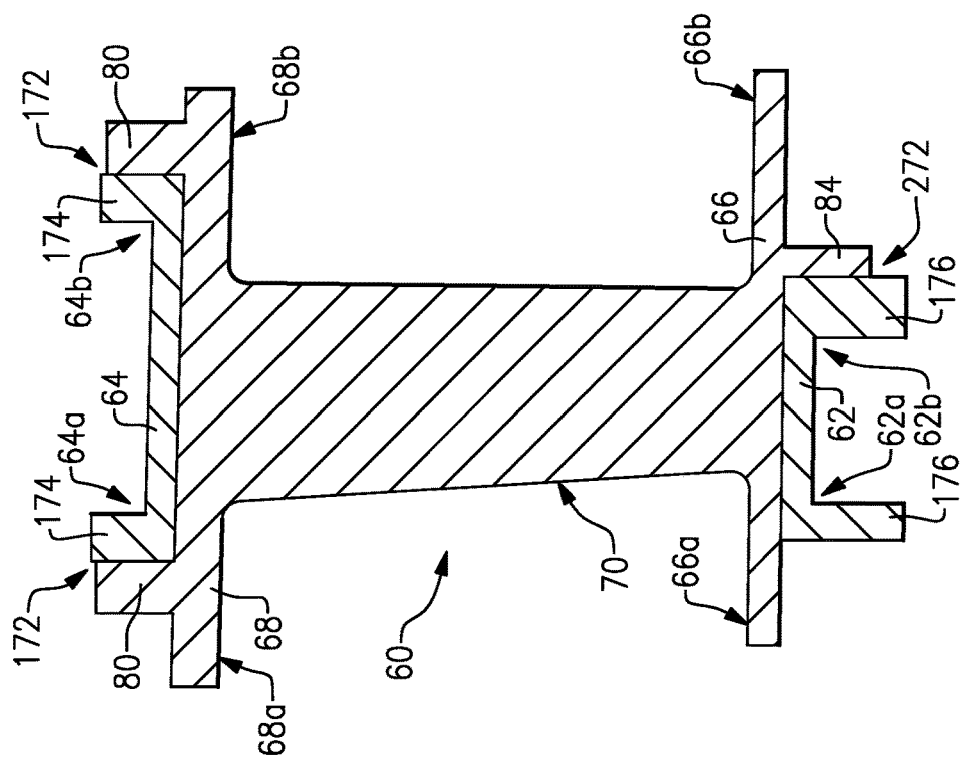
FIG. 7 illustrates an example of another configuration of retainers in which there are two retainers at the outer diameter.

FIG. 7 is similar to FIG. 6 except that instead of having two retainers 272, the vane arc segment 60 has two retainers 172 on the outer diameter of the vane arc segment and the inner diameter has only a single retainer 272. The single retainer (172 in FIG. 6 and 272 in FIG. 7 permits that vane arc segment 60 to be assembled with the support rings 62/64 from one axial side.

Figure 8:
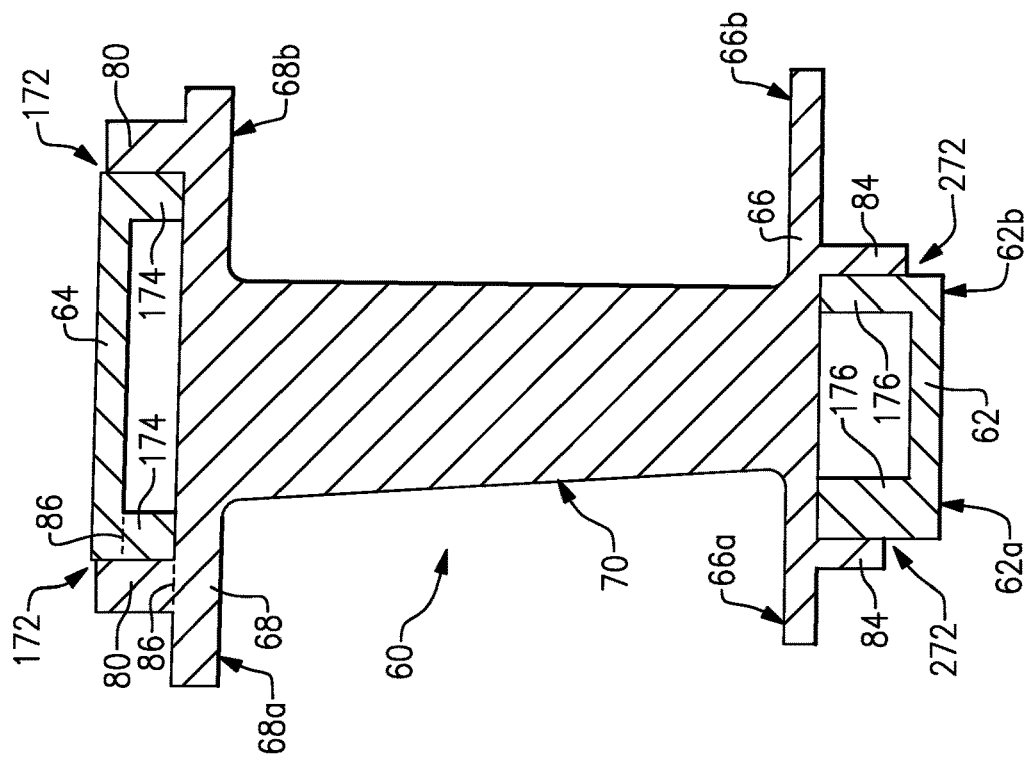
FIG. 8 illustrates an example of another configuration of retainers in which there are two retainers at the inner and outer diameter and the flanges at the outer diameter are castellated.
Figure 9:
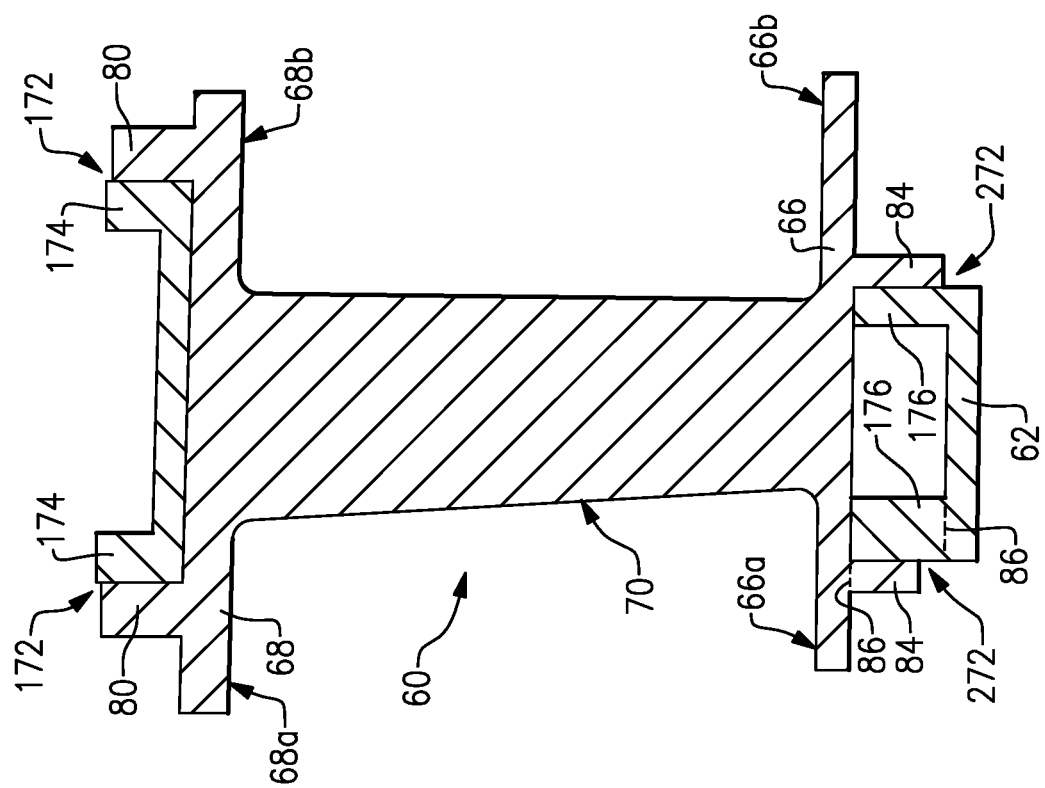
FIG. 9 illustrates an example of another configuration of retainers in which there are two retainers at the inner and outer diameter and the flanges at the inner diameter are castellated.

FIGS. 8 and 9 illustrate examples in which both the inner and outer diameters of the vane arc segment 60 have a pair of retainers 172 and a pair of retainers 272. In FIG. 8, the forward ones of the flanges 80 and 174 are castellated with notches 86. The vane arc segment 60 and the support ring 64 can be circumferentially clocked with respect to each other such that the notches misalign and thereby permit the flange 80 to pass axially through the flange 174 during assembly. Once the flange 80 passes and clears the flange 174, the vane arc segment 60 is rotated so that it is unable to pass back though the flange 174. FIG. 9 is similar except that it is the inner ring 62 and flanges 84 and 176 that have the notches 86.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A turbine section for a gas turbine engine, comprising:
inner and outer diameter ceramic matrix composite (CMC) support rings that define a gaspath there between, each of the inner and outer diameter CMC support rings being monolithic and continuous,
CMC vane arc segments disposed in the gaspath and supported by the inner and outer diameter CMC support rings, each of the CMC vane arc segments including inner and outer platforms and an airfoil section there between, and
at least one retainer engaging the inner or outer diameter CMC support rings with the CMC vane arc segments to retain the CMC vane arc segments between the inner and outer diameter CMC support rings, the outer diameter CMC support ring defining an outer diameter support ring aft end and a first support ring flange extending radially-inwardly from the outer diameter support ring aft end, the first support ring flange serving as the at least one retainer and engaging an aft face of the outer platform.

2. The turbine section as recited in claim 1, wherein the inner diameter CMC support ring defines an inner diameter support ring forward end and a second support ring flange that extends radially-outwardly from the inner diameter support ring forward end, the second support ring flange additionally serving as the at least one retainer and engaging a forward face of the inner platform.

3. The turbine section as recited in claim 2, wherein there is at least one contact pad between each of i) the outer diameter CMC support ring and the outer platform and ii) the inner diameter CMC support ring and the inner platform.

4. A turbine section for a gas turbine engine, comprising:
inner and outer diameter ceramic matrix composite (CMC) support rings that define a gaspath there between, each of the inner and outer diameter CMC support rings being monolithic and continuous,
CMC vane arc segments disposed in the gaspath and supported by the inner and outer diameter CMC support rings, each of the CMC vane arc segments including inner and outer platforms and an airfoil section there between, and
at least one retainer engaging the inner or outer diameter CMC support rings with the CMC vane arc segments to retain the CMC vane arc segments between the inner and outer diameter CMC support rings, wherein the outer diameter CMC support ring defines an outer diameter support ring aft end and a first support ring flange that extends radially-outwardly from the outer diameter support ring aft end, and the outer platform defines an outer platform aft end and a first platform flange that extends radially-outwardly from the outer platform aft end, an aft face of the first support ring flange serving as the at least one retainer and engaging a forward face of the first platform flange.

5. The turbine section as recited in claim 1, wherein the inner platform defines an inner platform aft end and a second platform flange that extends radially inwardly from the inner platform aft end, the inner diameter ceramic support ring including an inner diameter support ring aft face serving as the at least one retainer and engaging a forward face of the second platform flange.

6. The turbine section as recited in claim 1, wherein the inner diameter CMC support ring circumscribes a radially inner region, and the inner diameter CMC support ring fluidly isolates the gaspath from the inner region.

7. The turbine section as recited in claim 6, wherein the outer diameter CMC support ring bounds a radially outer region and fluidly isolates the gaspath from the radially outer region.

8. The turbine section as recited in claim 7, wherein the airfoil section of each of the CMC vane arc segments is hollow.

\* \* \* \* \*